J. W. BETTENDORF.
CAR TRUCK CONSTRUCTION.
APPLICATION FILED JUNE 17, 1911.
1,020,960.
Patented Mar. 26, 1912
3 SHEETS—SHEET 1.
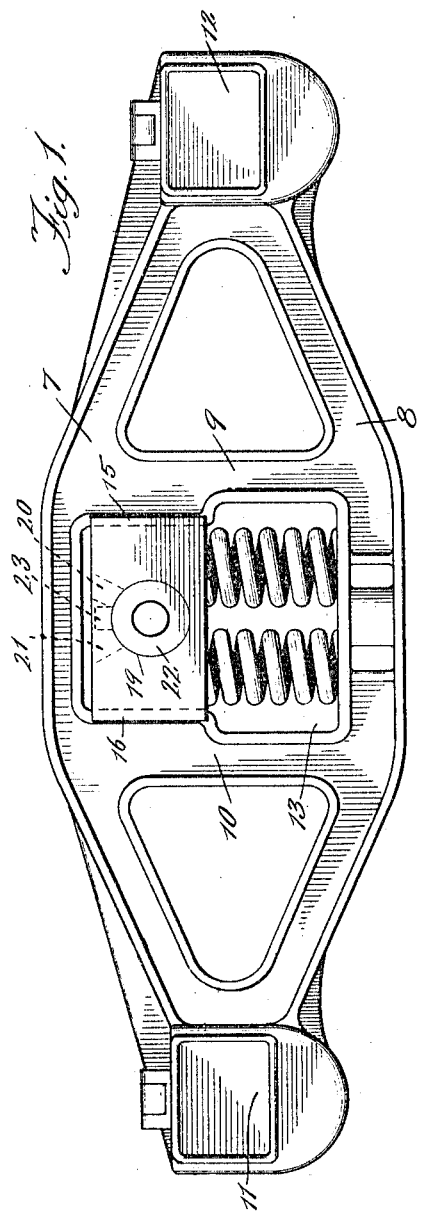
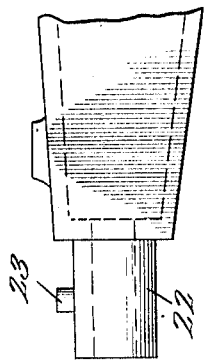
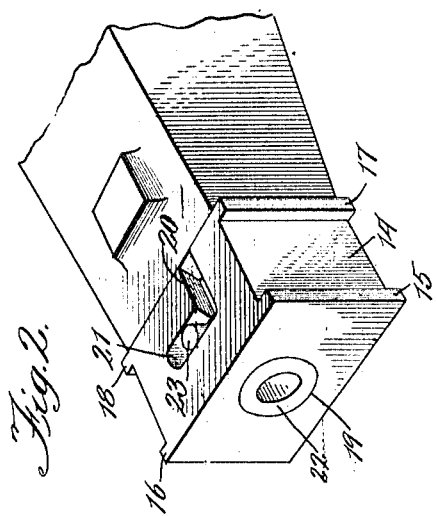
Witnesses:
Inventor:
Joseph W. Bettendorf J. W. DETTENDORF.
CAR TRUCK CONSTRUCTION.
APPLICATION FILED JUNE 17, 1911.
1,020,960.
Patented Mar. 26, 1912.
3 SHEETS—SHEET 2.
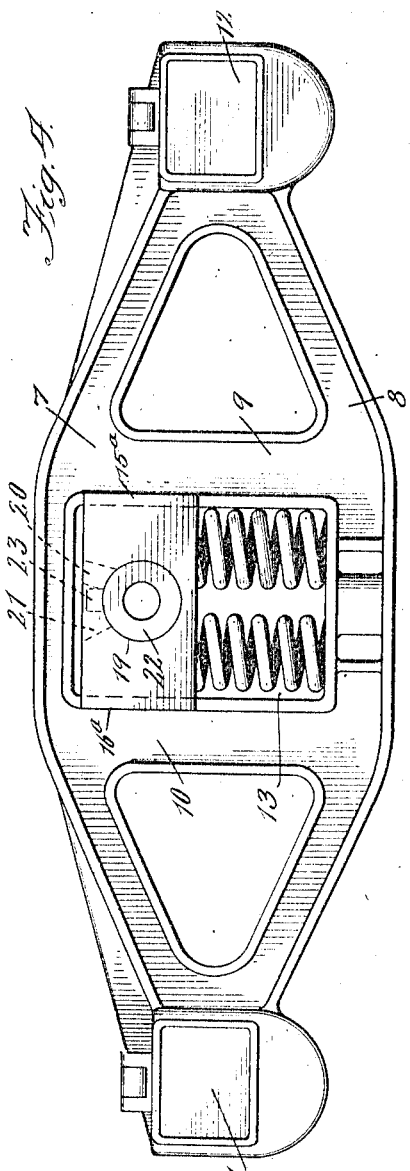
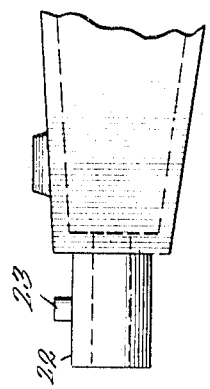
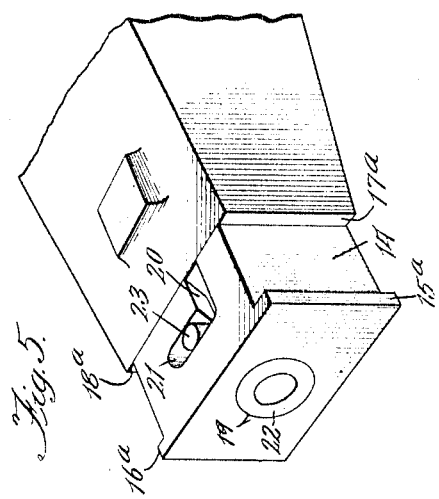

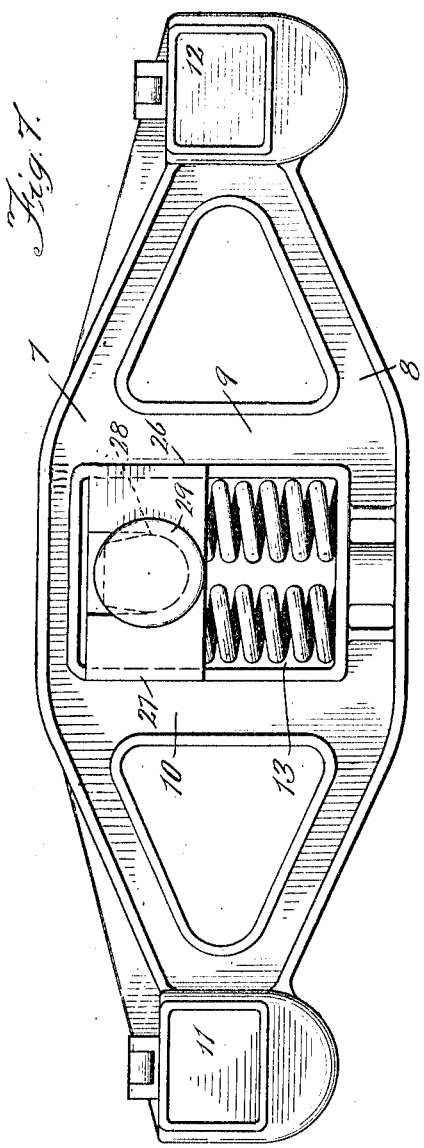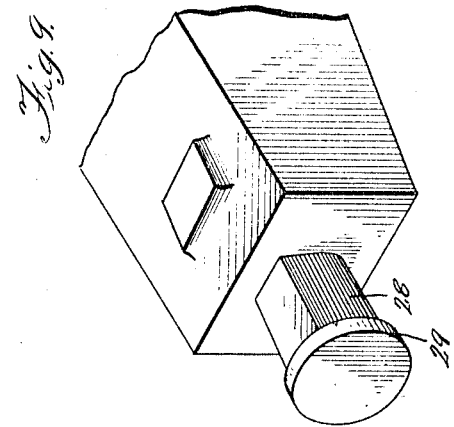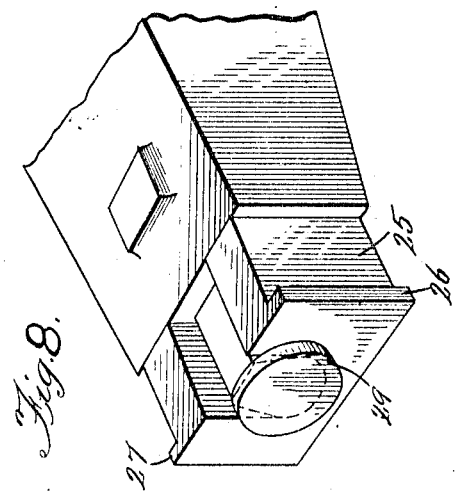

UNITED STATES PATENT OFFICE.

JOSEPH W. BETTENDORF, OF BETTENDORF, IOWA.

CAR-TRUCK CONSTRUCTION.

1,020,960.  Specification of Letters Patent.  Patented Mar. 26, 1912.

Application filed June 17, 1911. Serial No. 633,694.

*To all whom it may concern:*

Be it known that I, JOSEPH W. BETTENDORF, a citizen of the United States of America, and resident of Bettendorf, Scott county, Iowa, have invented a certain new and useful Improvement in Car-Truck Construction, of which the following is a specification.

My invention relates to improvements in car truck construction, and more particularly to improved means for supporting the end of the bolster in the side frame.

In prior constructions, in which the bolster was provided with a squared end which was supported within the bolster opening in the side frame, certain objectionable features arose owing to the rigid construction of this type of truck. In such a truck, if one of the wheel encountered a slight depression in the track, the wheel was prevented from following this depression owing to the rigid construction, and the truck was thus very liable to become derailed. By my invention, however, I provide a very flexible construction whereby the wheels are permitted to follow the rails closely, the bolster being supported so that it is capable of having a slight rotation within the side frame.

A further object of my invention is to provide such a flexible connection in a car truck in which the parts are securely held in position without the use of bolts or rivets, whereby the truck can be quickly assembled or disassembled.

These and other objects of my invention will be more clearly understood by reference to the accompanying drawings, in which similar reference characters refer to similar parts, and in which—

Figure 1 represents a side view of a truck embodying the features of my invention. Fig. 2 is a perspective view of the bearing supporting the end of the bolster. Fig. 3 is a side view of one end of the bolster. Fig. 4 is a side view of a car truck embodying a modified form of my invention. Fig. 5 is a perspective view of a locking bearing supporting the end of the bolster in this modified construction. Fig. 6 is a side view of one end of a bolster for use in this modified construction. Fig. 7 is a side view of a car truck embodying another modified form of my invention. Fig. 8 is a perspective view of a locking bearing supporting the end of the bolster in this modified construction. Fig. 9 is a perspective view of a modified form of bolster for use in this second modification.

I have illustrated in Fig. 1 a side frame comprising an upper arch bar 7 and a lower arch bar 8, and suitable columns 9 and 10, all of well known and usual construction. Bearings 11 and 12 are provided at opposite ends of this side frame, in a manner well understood, and the bolster opening is slightly enlarged at its lower portion, as shown at 13, for a purpose which will be hereinafter pointed out.

The locking bearing for supporting the end of the bolster shown in Fig. 2 comprises a rectangular body portion 14 and a pair of flanges 15—16 at its forward end, and a corresponding pair of flanges 17—18 at its rear end. A cylindrical bearing opening 19 passes longitudinally through the center of this block. In the upper portion there is an L-shaped slot having a longitudinal portion 20 and a transverse portion 21. The bolster may be of any of the well known types, and is modified simply by the fact that the ends of this bolster are reduced, as shown at 22, and this end portion is provided with a projecting lug 23, which lug is adapted to engage with the L-shaped slot in the locking casting, in a manner which will be hereinafter more clearly pointed out.

In assembling this type of truck, the locking bearing is first inserted in the enlarged portion 13 of the bolster opening and then raised so that the flanges 15 and 16 bear against one side of the side frame while the flanges 17 and 18 bear against the opposite side, thus supporting this bearing within the side frame and preventing any longitudinal or rotary movement of the same. The bolster springs 24 and 25 are then inserted beneath this bearing in a well known manner, so as to support the same, and the end 22 of the bolster is then inserted within the locking bearing so that the end engages within the opening 19 and is supported thereby. In the insertion of the bolster within the bearing the bolster is slightly rotated, so that the lug 23 first engages with the longitudinal portion 20 of the slot in the casting, and then when the transverse portion 21 of this slot is reached the bolster is rotated so that this lug engages with this transverse portion. This transverse portion of the slot is preferably of sufficient length so that after the truck is assembled the bolster will not be rotated a sufficient distance to permit the lug 23 to again engage with the longitudinal slot 20. By this construction it will be readily apparent that the bolster is securely held between the casting and side frame, so that it is prevented from any longitudinal movement on account of the engagement of the lug 23 with this transverse slot, but the bolster is adapted for a slight rotary movement on account of the length of the slot 21.

I have shown in Figs. 4, 5 and 6 a slightly modified construction in which the locking bearing 14 is provided with but a single pair of flanges 15$^a$ and 16$^a$, and in which the bolster itself bears against the inside of the side frame, as at 17$^a$ and 18$^a$, thus performing the function of the second flanges on the locking bearing. In this construction it is unnecessary to enlarge the bolster opening as in the prior construction, as the locking casting can be readily inserted within this opening, and is held from longitudinal movement in one direction by means of the lugs 15$^a$ and 16$^a$, and is held from movement in the opposite direction by means of the flanges on the bolster, to which it is securely locked by means of the pin-and-slot connection, which flanges bear against the inside of the side frame. The other features of this modified form are substantially the same as that described in connection with Figs. 1, 2 and 3, the bolster being supported and locked in position in substantially the same manner.

In Figs. 7, 8 and 9 I have shown a still further modification of my invention, whereby I obtain a limited rotation of the side frame with respect to the bolster without the use of the pin-and-slot connection. In this modification I employ a locking bearing 25 provided with a pair of flanges 26 and 27, similar to the flanges 15$^a$ and 16$^a$ shown in the prior modification. The central portion of this locking bearing is hollowed out so as to provide a U-shaped opening within which the reduced end 28 of the bolster is adapted to rest. This end portion of the bolster is partially rounded, but is preferably flattened at its upper surface, so that it is practically of a horse-shoe shape in cross-section. It is likewise provided with a slightly enlarged end portion 29 which bears against the front surface of the locking bearing 25, as clearly shown in Figs. 7 and 8. It will be noted that the end portion 28 is rounded so as to bear against the lower portion of the U-shaped opening in the locking bearing, but the upper curved portion of this reduced end curves away from the sides of this opening, so that a partial rotation of this bearing with respect to the bolster is permitted. This locking bearing is mounted within the opening in the side frame in a manner similar to the bearing shown in Figs. 4 and 5, and it will accordingly be seen that by this construction a slight rotation is permitted between the side frame and the bolster, in a manner similar to that described and shown in the previous modification.

It will thus be seen that I have constructed a very efficient means for supporting the bolster within the side frame, and have provided means, in a truck in which the parts are all held together without bolts or rivets, whereby a very flexible construction is obtained and in which the bolster has a limited rotative connection with the side frame.

While I have shown certain specific embodiments of my invention, it is understood that I do not wish to be limited to such exact construction.

What I claim as my invention is:

1. In a car truck, a side frame having a bolster opening therein, a bearing movably supported within said opening, and a bolster having a limited rotative connection with said bearing.

2. In a car truck, side frames, a movable bearing, a bolster held in said frames by said bearing, and means for permitting rotation of said bolster relative to said side frames.

3. In a car truck, a bolster, side frames, bearings held therein, bolster springs supporting said bearings, and means for supporting said bolster within said bearings, so that said bolster is capable of rotation with respect to said side frames.

4. In a car truck, side frames, movable bearings held within said side frames, a bolster, and means for supporting said bolster within said bearings, so that said bolster is capable of rotation but is held against any longitudinal movement with respect to said side frames.

5. In a car truck, a bolster, side frames having bolster openings therein, movable bearings provided with flanges bearing against the sides of said openings, and means for permitting rotation of said bolster relative to said side frames.

6. In a car truck, side frames having bolster openings therein, bearings having angular slots, supported within said openings, a bolster provided with lugs adapted to engage with said slots, whereby said bolster is permitted to rotate but is held against longitudinal movement with respect to said bearings.

7. In a car truck, side frames having bolster openings therein, bearings having angular slots supported within said openings, flanges on said bearings bearing against the sides of said openings, whereby it is held within said openings, and a bolster provided with a lug adapted to engage with said slot, whereby said bolster is permitted a limited rotation but is held against longitudinal movement with respect to said bearing.

Signed by me at Bettendorf, Iowa, this 12th day of June 1911.

JOSEPH W. BETTENDORF.

Witnesses:
HENRY BELLINGHAUSEN,
F. M. GODDARD.